(12) United States Patent
Katayose et al.

(10) Patent No.: US 8,076,054 B2
(45) Date of Patent: Dec. 13, 2011

(54) COMPOSITION FOR FORMING ADHESIVE LAYER AND RELIEF PRINTING PLATE USING THE SAME, AND METHOD FOR MANUFACTURING RELIEF PRINTING PLATE

(75) Inventors: Yoshiaki Katayose, Kanagawa (JP); Takaaki Hirai, Kanagawa (JP); Syunji Nakazato, Kanagawa (JP)

(73) Assignee: Tokyo Ohka Kogyo Co., Ltd., Kawasaki-shi (JP)

( * ) Notice: Subject to any disclaimer, the term of this patent is extended or adjusted under 35 U.S.C. 154(b) by 17 days.

(21) Appl. No.: 11/676,495

(22) Filed: Feb. 19, 2007

(65) Prior Publication Data
US 2007/0243486 A1    Oct. 18, 2007

(30) Foreign Application Priority Data
Feb. 21, 2006 (JP) ................. 2006-044480

(51) Int. Cl.
*G03F 7/00* (2006.01)
*G03F 7/26* (2006.01)

(52) U.S. Cl. ........... 430/306; 430/281.1; 430/283.1

(58) Field of Classification Search ........ 430/270.1, 430/284.1, 285.1, 286.1, 300
See application file for complete search history.

(56) References Cited

U.S. PATENT DOCUMENTS

| | | |
|---|---|---|
| 3,458,311 A | 7/1969 | Alles |
| 3,794,494 A | 2/1974 | Kai et al. |
| 4,045,231 A | 8/1977 | Toda et al. |
| 4,177,074 A | 12/1979 | Proskow |
| 4,323,636 A | 4/1982 | Chen |
| 4,361,640 A | 11/1982 | Pine |
| 4,430,417 A | 2/1984 | Heinz et al. |
| 4,431,723 A | 2/1984 | Proskow |
| 4,442,302 A | 4/1984 | Pohl |
| 4,459,348 A * | 7/1984 | Jun et al. .......... 430/271.1 |
| 4,460,675 A | 7/1984 | Gruetzmacher et al. |
| 4,517,279 A | 5/1985 | Worns |
| 4,726,877 A | 2/1988 | Fryd et al. |
| 4,753,865 A | 6/1988 | Fryd et al. |
| 4,894,315 A | 1/1990 | Feinberg et al. |
| 6,090,897 A * | 7/2000 | Akasaki et al. .......... 428/520 |

(Continued)

FOREIGN PATENT DOCUMENTS

EP    0269421 A2    6/1988

(Continued)

OTHER PUBLICATIONS

Oxford English Dictionary, "admixture" (2010).*

*Primary Examiner* — Cynthia Kelly
*Assistant Examiner* — Chanceity Robinson
(74) *Attorney, Agent, or Firm* — Knobbe Martens Olson & Bear LLP

(57) ABSTRACT

A composition for forming an adhesive layer which results in strong adhesion force between a substrate and a photosensitive resin layer, and which does not cause transfer of the constituting components to the substrate, a relief printing plate using the same, and a method for manufacturing a relief printing plate are provided. The composition of the present invention comprises (a) a carboxyl group-containing polymer, and (b) an oxazoline group-containing polymer. Adhesive layer 20 formed using the composition of the present invention can be preferably used as an adhesive layer that adheres between substrate 10 and photosensitive resin layer 30 in a relief printing plate.

9 Claims, 1 Drawing Sheet

U.S. PATENT DOCUMENTS

2003/0235704 A1* 12/2003 Akatsu et al. .................. 428/482
2005/0100820 A1* 5/2005 Satake et al. ................ 430/271.1
2006/0210768 A1* 9/2006 Masuda ........................ 428/141

FOREIGN PATENT DOCUMENTS

| | | |
|---|---|---|
| EP | 0846731 A2 | 6/1998 |
| EP | 0 741 330 B1 | 11/1999 |
| EP | 1059346 A1 | 12/2000 |
| JP | 9166875 | 6/1997 |
| JP | 11153865 | 6/1999 |
| JP | 2001324815 | 11/2001 |
| JP | 2003035954 | 2/2003 |
| JP | 2003035955 | 2/2003 |
| JP | 2003280186 | 10/2003 |
| WO | WO 94/03838 | 2/1994 |

* cited by examiner

COMPOSITION FOR FORMING ADHESIVE LAYER AND RELIEF PRINTING PLATE USING THE SAME, AND METHOD FOR MANUFACTURING RELIEF PRINTING PLATE

This application is based on and claims the benefit of priority from Japanese Patent Application No. 2006-044480, filed on 21 Feb. 2006, the content of which is incorporated herein by reference.

BACKGROUND OF THE INVENTION

1. Field of the Invention

The present invention relates to a composition for forming an adhesive layer for use in a relief printing plate. More particularly, the present invention relates to a composition for forming the adhesive layer provided between a substrate and a photosensitive resin layer, a relief printing plate using the same, and a method for manufacturing a relief printing plate.

2. Related Art

In plate making for relief printing plates including flexography printing plates, a photosensitive resin has been generally used. The photosensitive resin is generally constructed with an elastomeric binder, at least one photopolymerizable monomer, and a photoinitiator. Printing plates in which the photosensitive resin is used are plate members having at least a photosensitive resin layer provided on a support.

Thus obtained printing plate is fixed on a printing cylinder of a printing press by a double-sided tape or vacuum drawing, and then subjected to use in printing. Therefore, it is necessary to prevent the support and the photosensitive resin layer from detachment due to shear stress between the printing cylinder and the impression cylinder during printing, or otherwise during its storage after completion of the printing.

Hence, for the purpose of improving cohesiveness, a method in which an easily adherable film is provided between the substrate and the photosensitive resin layer is disclosed (see, Patent Document 1). Conventionally, constructions in which a polymerized product of acrylate or methacrylate was used as a principal constituent were proposed as the easily adherable film.

(Patent Document 1) Japanese Unexamined Patent Application Publication No. 2003-280186

SUMMARY OF THE INVENTION

However, sufficient adhesion force between the substrate and the photosensitive resin layer is not attained by merely forming the easily adherable film according to such a construction.

The present invention was accomplished in view of the abovementioned problems, and an object of the present invention is to provide a composition for forming an adhesive layer which results in strong adhesion force between the substrate and the photosensitive resin layer, and which does not cause transfer of the components constituting the adhesive layer to the substrate; and a relief printing plate using the same, and a method for manufacturing a relief printing plate.

DETAILED DESCRIPTION OF THE INVENTION

Figure 1:
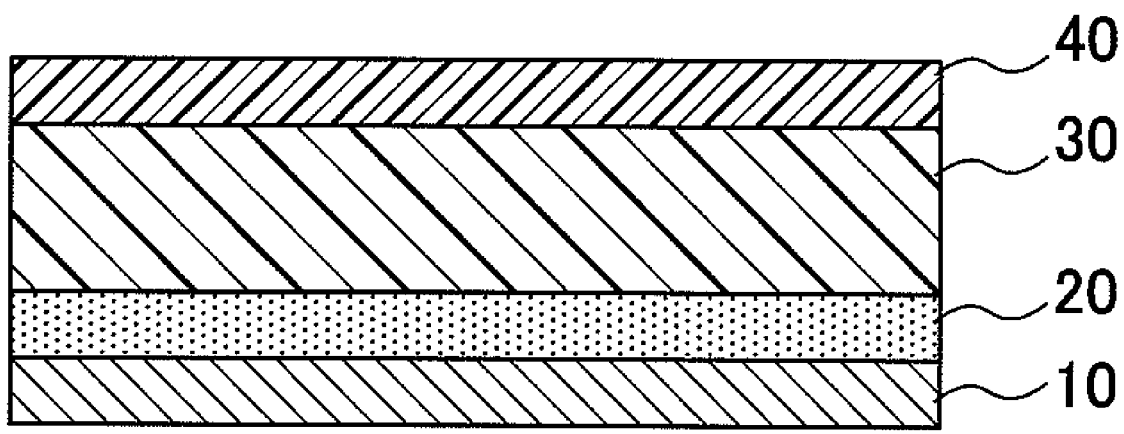
FIG. 1 shows a schematic view illustrating the entire construction of the relief printing plate of the present invention.

In order to solve the abovementioned problems, the present inventors have conducted thorough experimentation, and focused their attention on the need for improvement of the adhesion force of the adhesive layer. Consequently, it was found that the problems can be solved by including a polymer containing a substituent that reacts with the substrate as a constitute component of the adhesive layer, or by including a photopolymerizable monomer depending on the circumstances. Hence, the present invention was accomplished. In particular, the present invention provides the following.

An aspect of the present invention is to provide a composition for forming an adhesive layer comprising (a) a carboxyl group-containing polymer, and (b) an oxazoline group-containing polymer.

Furthermore, another aspect of the present invention is to provide a relief printing plate comprising a substrate and a photosensitive resin layer laminated via an adhesive layer formed using the aforementioned composition for forming the adhesive layer.

Yet another aspect of the present invention is to provide a method for manufacturing a relief printing plate comprising: an adhesive layer forming step for forming an adhesive layer by applying the composition for forming the adhesive layer on a substrate; an adhesive layer curing step for curing the adhesive layer by heating the adhesive layer; and a photosensitive resin laminating step for forming a photosensitive resin layer on the adhesive layer.

With the composition of the present invention, the adhesion force between the substrate and the adhesive layer, and water resistance and solvent resistance of the adhesive layer can all be improved. Moreover, the strength of the adhesive layer can also be improved.

Hereinafter, the embodiments of the present invention will be explained.

A. Relief Printing Plate

FIG. 1 shows an outline illustrating the entire construction of the relief printing plate of the present invention. The relief printing plate of the present invention is a laminate comprising a substrate 10, an adhesive layer 20 consisting of the composition of the present invention formed on the substrate 10, and a photosensitive resin layer 30 formed thereon consisting of a photosensitive resin composition. Moreover, a cover film 40 can be also laminated on the photosensitive resin layer.

B. Substrate

The substrate constructing the relief printing plate of the present invention is not particularly limited as long as it satisfies the physical capabilities such as mechanical strength and the like required for printing conditions to be employed. For example, any of all substrates such as known metal plates, resin plates, and composite modes in which plastic films used in common flexography printing plates is laminated on the same can be used. Examples of their material include polymeric films formed with an addition polymer and a linear condensation polymer, transparent foams and woven fabrics, non-woven fabrics, e.g., glass fiber woven fabrics, and metals such as steel and aluminum. The substrate is preferably transparent to exposure lights such that the back exposure is facilitated. Moreover, a substrate having a surface which has been subjected to a corona treatment may be also permitted. Exemplary more suitable substrate preferably used may be substrates comprising a carboxyl group-containing polymer. As the carboxyl group-containing polymer, polyethylene terephthalate, polyethylene naphthalene and the like may be exemplified. By thus using the carboxyl group-containing polymer as the substrate, a reaction with the oxazoline group-containing polymer comprised in the composition may be allowed, thereby capable of improving the adhesiveness between the adhesive layer and the substrate.

C. Composition for Forming Adhesive Layer

The composition for forming the adhesive layer of the present invention comprises the carboxyl group-containing polymer (a), and the oxazoline group-containing polymer (b).

(a) Carboxyl Group-Containing Polymer

The carboxyl group-containing polymer (a) is a constituent that contributes to improvement of the film strength of the adhesive layer by polymerization with heating. The use of such a carboxyl group-containing polymer is not particularly limited as long as it has a carboxyl group, and is preferably at least one selected from acrylic polymers, polyester-based polymers, and urethane-based polymers.

Specifically, a polymer obtained by polymerization of acrylic acid, methacrylic acid, fumaric acid, maleic acid, monomethyl fumarate, monoethyl fumarate or the like may be used.

Use of such a carboxyl group-containing polymer is advantageous because film strength can be adjusted by regulating the heating time, thereby enabling improvement of water resistance, and solvent resistance.

The molecular weight of the carboxyl group-containing polymer is preferably 1,000 to 500,000, and more preferably 1,500 to 300,000.

(b) Oxazoline Group-containing Polymer

The oxazoline group-containing polymer (b) is efficacious in improving the adhesion force between the adhesive layer and the substrate. The use of the oxazoline group-containing polymer is not particularly limited, as long as it is a polymer having an oxazoline group and is preferably at least one selected from acrylic polymers, and styrene-based polymers. Specifically, the oxazoline group-containing polymer can be synthesized using a monomer having an oxazoline skeleton, as at least one of the raw material monomers. Examples of the monomer having an oxazoline skeleton include 2-vinyl-2-oxazoline, 5-methyl-2-vinyl-2-oxazoline, 4,4-dimethyl-2-vinyl-2-oxazoline, 4,4-dimethyl-2-vinyl-5,6-dihydro-4H-1-oxazine, 4,4,6-trimethyl-2-vinyl-5,6-dihydro-4H-1,3-oxazine, 2-isopropenyl-2-oxazoline, 4,4-dimethyl-2-isopropenyl-2-oxazoline, 4-acryloyl-oxymethyl-2,4-dimethyl-2-oxazoline, 4-methacryloyl-oxymethyl-2,4-dimethyl-2-oxazoline, 4-methacryloyl-oxymethyl-2-phenyl-4-methyl-2-oxazoline, 2-(4-vinylphenyl)-4,4-dimethyl-2-oxazoline, 4-ethyl-4-hydroxymethyl-2-isopropenyl-2-oxazoline, 4-ethyl-4-carboethoxymethyl-2-isopropenyl-2-oxazoline and the like.

Furthermore, the oxazoline equivalent is preferably 10 to 2000 g-solid/eq, and more preferably falls within the range of 50 to 1800 g-solid/eq.

(c) Carboxyl Group-containing Photopolymerizable Monomer

Also, the carboxyl group-containing photopolymerizable monomer (c) may be blended as needed in the composition of the present invention.

The carboxyl group-containing photopolymerizable monomer (c) further improves adhesion force between the photosensitive resin layer and the adhesive layer. Examples of such a carboxyl group-containing photopolymerizable monomer which may be used include acrylic acid, methacrylic acid, fumaric acid, maleic acid, monomethyl fumarate, monoethyl fumarate and the like.

Moreover, with respect to the oxazoline group-containing polymer (b), it is preferred that number of the oxazoline group in the oxazoline group-containing polymer (b) be 1.1 to 10 times the total number of the carboxyl groups in the carboxyl group-containing polymer (a) and the carboxyl groups in the carboxyl group-containing photopolymerizable monomer (c), which is added as needed. By producing the composition to fall within such a range, the oxazoline group shall be present excessively, and reacts also with the carboxyl group of the substrate, whereby adhesion properties with the substrate can be further improved.

In addition, by using the aforementioned constituents (a) and (b) as essential constituents of the composition, the carboxyl group of the carboxyl group-containing polymer (a) reacts with the oxazoline group of the oxazoline group-containing polymer (b), transfer of the constituent in the composition to the photosensitive resin layer side can be prevented according to the present invention.

Moreover, a reaction catalyst such as a phosphate ester-based compound may be blended as needed in the composition of the present invention. By thus blending such a catalyst, reactivity of the oxazoline group with the carboxyl group can be still further improved.

D. Photosensitive Resin Composition

The photosensitive resin composition which can be used in the present invention is not particularly limited, and a conventionally known composition can be used. Examples of such a composition include e.g., compositions containing the following (D-1) photosensitive resin, (D-2) photopolymerizable monomer, and (D-3) photoinitiator.

D-1: Photosensitive Resin

The photosensitive resin is acceptable as long as it has a polymerizable unsaturated group that is crosslinkable upon light irradiation. Specifically, a resin that is crosslinked with the photopolymerizable monomer (D-2) by the photoinitiator (D-3) described later is preferably used. As such a resin, an elastomer resin is preferably used.

The elastomer resin may be a polymer removable by washing, which may be a single polymer, a copolymer or a mixture thereof, has an elastomeric property, and dissolves, swells or disperses in a developer that is an aqueous or organic solvent. Examples of the binders include e.g., polybutadiene, polyisoprene, polydiolefin, copolymers and block copolymers of a vinyl aromatic compound/diolefin, styrene/butadiene copolymers, styrene/isoprene copolymers, diolefin/acrylonitrile copolymers, ethylene/propylene copolymers, ethylene/propylene/diolefin copolymers, ethylene/acrylic acid copolymers, diolefin/acrylic acid copolymers, diolefin/acrylate/acrylic acid copolymers, ethylene/(meth)acrylic acid/(meth)acrylate copolymers, polyamide, polyvinyl alcohol, graft copolymers of polyvinyl alcohol/polyethylene glycol, amphoteric interpolymers, celluloses such as alkyl cellulose, hydroxyalkyl cellulose and nitrocellulose, ethylene/vinyl acetate copolymers, cellulose acetate butyrate, polybutyral, cyclic rubbers, styrene/acrylic acid copolymers, polyvinylpyrrolidone, copolymers of polyvinylpyrrolidone and vinyl acetate, chloroprene polymers, styrene-chloroprene copolymers, acrylonitrile-butadiene copolymers, acrylonitrile-isoprene copolymers, acrylonitrile-chloroprene copolymers, methyl methacrylate-butadiene copolymers, methyl methacrylate-isoprene copolymers, methyl methacrylate-chloroprene copolymers, methyl acrylate-butadiene copolymers, methyl acrylate-isoprene copolymers, methyl acrylate-chloroprene copolymers, acrylonitrile-butadiene-styrene copolymers, acrylonitrile-isoprene-styrene copolymers, acrylonitrile-chloroprene-styrene copolymers, epichlorohydrin polymers, epichlorohydrin-ethylene oxide copolymers, epichlorohydrin-propylene oxide copolymers, epichlorohydrin rubbers, chlorinated polyethylene, vinyl chloride copolymers, vinylidene chloride copolymers, chlorinated polypropylene, chlorinated ethylene-propylene rubbers, ethyl acrylate-acrylonitrile copolymers, terpene copolymers, butyl acrylate-acrylonitrile copolymers, methyl methacrylate-acrylonitrile copolymers, butyl acrylate-styrene-acrylonitrile copolymers, and the like. The polymer may be used alone, or in any combination thereof. In addition, the resin that is a binder which can be dissolved or dispersed in an aqueous developer and which is disclosed in U.S. Pat. Nos. 3,458,311, 4,442,302, 4,361,640, 3,794,494, 4,177,074, 4,431,723, 4,517,279 and the like, and the resin which can be dissolved, swollen or dispersed in an organic solvent developer and which is disclosed in United States Patent Nos. 4,323,636, 4,430,417, 4,045,231 and the like can be also exemplified.

Examples of the elastomer resin which can be preferably used include styrene/isoprene copolymers, and styrene/butadiene copolymers. Use of such an elastomer resin can ensure transparency required for forming an exposure pattern, and can still further improve resistance to the printing liquid (ink).

The amount of the blended elastomer resin is 10 to 99 parts by mass, and preferably 30 to 90 parts by mass in terms of the elastomer resin per 100 parts by mass of total composition for the photosensitive resin layer.

D-2: Photopolymerizable Monomer

As one or more monomers comprised in the photosensitive resin layer, a monomer having compatibility with the binder must be used such that a transparent and unclouded photosensitive resin layer can be formed. Examples of the monomer include, in addition to the monomer constituting the binder, e.g., polybutadiene diacrylate, polybutadiene dimethacrylate, polyisoprene diacrylate, polyisoprene dimethacrylate, and aromatic vinyl monomers such as α-methylstyrene, m-methylstyrene and p-methoxystyrene; α,β-ethylenic unsaturated nitrile compounds such as acrylonitrile and methacrylonitrile; acrylates of an alkyl alcohol having 1 to 23 carbon atoms such as methyl acrylate, ethyl acrylate, propyl acrylate, n-butyl acrylate, isobutyl acrylate and t-butyl acrylate, and methacrylates corresponding thereto; acrylates of a hydroxyalkyl alcohol such as 2-hydroxyethyl acrylate and 2-hydroxypropyl acrylate, and methacrylates corresponding thereto; acrylates and methacrylates of alkoxyalkylene glycol such as methoxyethylene glycol, and methoxypropylene glycol; monoesters of an unsaturated polycarboxylic acid such as monoethyl maleate, monomethyl fumarate, and monoethyl itaconate; diesters such as dimethyl maleate, diethyl maleate, dibutyl maleate, dioctyl maleate, diethyl fumarate, dibutyl fumarate, dioctyl fumarate, dimethyl itaconate, diethyl itaconate, dibutyl itaconate, and dioctyl itaconate; acrylamides such as acrylamide, methacrylamide, N,N'-methylenebisacrylamide and N,N'-hexamethylenebisacrylamide, and methacryl amides corresponding thereto; ethylene glycol diacrylate and diacrylates of glycol of polyalkylene glycol (having 2 to 23 alkylene glycol units), and methacrylates corresponding thereto; diacrylate, triacrylate, tetraacrylate and oligoacrylates of a trihydric or higher polyhydric alcohol such as glycerin, pentaerythritol, trimethylolalkane or tetramethylolalkane (alkane being methane, ethane, or propane), and methacrylates corresponding thereto; acrylates having an acidic functional group such as 2-acryloyloxyethyl succinate, 2-acryloylethyl hexahydrophthalate or 2-acryloyloxyethyl acid phosphate, and methacrylates corresponding thereto; and the like. Any one of these photopolymerizable ethylenic unsaturated monomers may be used alone, or in combination of two or more thereof. In addition, monomers described in U.S. Pat. Nos. 4,323,636, 4,753,865, 4,726,877 and 4,894,315 may be exemplified. Also, the photopolymerizable monomer may be used alone, or in combination.

The content of the foregoing monomer may fall within the range of 5 to 30 parts by mass, and preferably 10 to 20 parts by mass provided that total elastomer resin accounts for 100 parts by mass. When the content of the monomer is less than the above range, abrasion resistance and chemical resistance of the coated film after the exposure and curing may be deteriorated, while the content exceeding the above range is not preferred for the flexography printing plate because the elastomeric property of the photosensitive resin layer may be deteriorated.

D-3: Photoinitiator

As the photoinitiator, any generally known photoiniator may be used. Examples of such a photoinitiator include: aromatic ketones such as benzophenone; benzoin ethers such as benzoinmethyl ether, benzoinethyl ether, benzoinisopropyl ether, (α-methylolbenzoinmethyl ether, α-methoxybenzoinmethyl ether, and 2,2-diethoxyphenylacetophenone; substituted or unsubstituted polynuclear quinones; 1-hydroxycyclohexylphenylketone, 2,2-dimethoxy-1,2-diphenylethane-1-one, 2-methyl-1-[4-(methylthio)phenyl]-2-morpholinopropane-1-one, 2-benzyl-2-dimethylamino-1-(4-morpholinophenyl)-butane-1-one, 2-hydroxy-2-methyl-1-phenylpropane-1-one, 2,4,6-trimethylbenzoyldiphenylphosphine oxide, 1-[4-(2-hydroxyethoxy)phenyl]-2-hydroxy-2-methyl-1-propane-1-one, 2,4-diethylthioxanthone, 2-chlorothioxanthone, 2,4-dimethylthioxanthone, 3,3-dimethyl-4-methoxybenzophenone, benzophenone, 1-chloro-4-propoxythioxanthone, 1-(4-isopropylphenyl)-2-hydroxy-2-methylpropane-1-one, 1-(4-dodecylphenyl)-2-hydroxy-2-methylpropane-1-one, 4-benzoyl-4'-methyldimethylsulfide, 4-dimethylaminobenzoic acid, methyl 4-dimethylaminobenzoate, ethyl 4-dimethylaminobenzote, butyl 4-dimethylaminobenzoate, 2-ethylhexyl 4-dimethylaminobenzoate, 2-isoamyl 4-dimethylaminobenzoate, 2,2-diethoxyacetophenone, benzyldimethylketal, benzyl-β-methoxyethylacetal, methyl o-benzoylbenzoate, bis(4-dimethylaminophenyl)ketone, 4,4'-bisdiethylaminobenzophenone, 4,4'-dichlorobenzophenone, benzyl, benzoin, benzoinmethyl ether, benzoinethyl ether, benzoinisopropyl ether, benzoin-n-butyl ether, benzoinisobutyl ether, p-dimethylaminoacetophenone, p-tert-butyltrichloroacetophenone, p-tert-butyldichloroacetophenone, 2-(o-chlorophenyl)-4,5-diphenylimidazolyl dimer, thioxanthone, 2-methylthioxanthone, 2-isopropylthioxanthone, dibenzosuberone, α,α-dichloro-4-phenoxyacetophenone, pentyl-4-dimethylaminobenzoate, 9-phenylacridine, 1,7-bis-(9-acridinyl)heptane, 1,5-bis-(9-acridinyl)pentane, 1,3-bis-(9-acridinyl)propane, and the like. In addition, photoinitiators disclosed in U.S. Pat. Nos. 4,460,675 and 4,894,315, and the like may be exemplified. The photoinitiator may be used alone, or in combination.

Furthermore, a dye, a pigment, a polymerization inhibitor, an antioxidant, a photodegradation inhibitor and the like may be added to the photosensitive resin composition of the present invention as needed, in order to improve performance.

E. Cover Film

In the present invention, a cover film 40 may be provided on the photosensitive resin layer 30 as needed. As the cover film 40, a polyethylene terephthalate film, a polypropylene film, a polyethylene film or the like having a thickness of approximately 15 to 125 μm is suitable. The cover film is attached temporarily for facilitating the storage, convey, and handling. Thus, upon manufacturing the printing plate, the protective layer is detached to allow the photosensitive resin layer to be exposed as the surface, to which a patterning light is irradiated. Also, the cover film may be covered by a thin cohesion preventive layer in between the photosensitive resin layer as needed. The cohesion preventive layer comprises polypropylene, polyester, polystyrene, cellulose derivatives, polyamide resins and the like.

According to the relief printing plate of the present invention having such a construction, a relief printing plate is obtained in which the substrate and the photosensitive resin layer are hardly detached.

F. Method for Manufacturing the Relief Printing Plate

The method for manufacturing the relief printing plate of the present invention comprises an adhesive layer forming step for forming the adhesive layer by applying the composition for forming the adhesive layer on a substrate, an adhesive layer curing step for curing the adhesive layer by heating the adhesive layer, and a photosensitive resin laminating step for forming the photosensitive resin layer on the adhesive layer. Moreover, by carrying out the step of exposure and development, a pattern for printing can be formed on the photosensitive resin layer.

F-1: Adhesive Layer Forming Step

The step of forming the adhesive layer of the present invention is not particularly limited, but may be freely selected from processes commonly used for laminating the adhesive layer on the substrate. For example, the composition prepared by mixing the carboxyl group-containing polymer (a), and the oxazoline group-containing polymer (b) is applied to form a coating film.

F-2: Adhesive Layer Curing Step

Next, the coating film is cured by a heating treatment to form the adhesive layer. The process for heating is not particularly limited, however, for example, the adhesive layer is formed by being heated at 80 to 150° C. for 1 to 120 min.

When the adhesive layer is formed, in cases in which the substrate contains a carboxyl group, it is expected that the oxazoline group of the oxazoline group-containing polymer constituting the adhesive layer is allowed to react with the carboxyl group in the substrate by heating, whereby the adhesiveness is improved. Furthermore, the composition is polymerized by thus heating, and thereby capable of improving the film strength. Accordingly, the water resistance and the solvent resistance of the film itself can be improved, and furthermore, transfer of the constituents in the composition to the photosensitive resin layer can be prevented.

Additionally, because the reaction with the oxazoline group proceeds with heat, the adhesion force with the substrate can be readily improved along with curing of the adhesive layer. Also, the oxazoline group is accompanied by few impurities due to the heating, and a favorable relief printing plate with a slight amount of impurities on the surface thereof can be manufactured.

F-3: Photosensitive Resin Laminating Step

Following the adhesive layer curing step, the photosensitive resin layer is formed on the adhesive layer. Also, the photosensitive resin laminating step is not particularly limited, but may be freely selected from processes commonly used for laminating the photosensitive resin. Specifically, it can be formed by a process similar to one including the aforementioned adhesive layer forming step.

The thickness of the relief printing plate is preferably 0.1 to 7.5 mm, and more preferably 1.14 to 7.5 mm.

F-4: Exposure and Development Step

By irradiating an exposure light onto the photosensitive resin layer via a mask material layer, the pattern is transferred to the photosensitive resin layer. Subsequently, a development treatment is carried out using a petroleum-based developer to manufacture the relief printing plate.

In addition, the exposure treatment can improve the adhesion properties between the adhesive layer and the photosensitive resin layer through polymerization of the monomer comprised in the photosensitive resin layer and the carboxyl group-containing photopolymerizable monomer in the adhesive layer. Furthermore, the carboxyl group-containing photopolymerizable monomers in the corresponding part are polymerized, whereby the strength of the adhesive layer of the part is further improved. Accordingly, the water resistance, and the solvent resistance of the adhesive layer are further improved.

As the process for forming the mask image layer patterned so that the exposure light transmits a part of the mask material layer, a process in which an infrared ray ablation layer consisting of an infrared ray sensitive material is provided as the mask material layer, and the negative pattern is formed by selectively ablating (burning out) the infrared ray ablation layer by an infrared laser has been predominantly carried out. With respect to the infrared ray ablation layer, see, for example, Japanese Patent No. 2916408, Japanese Patent Application Publication Nos. 2003-35954, 2003-35955, Hei 11-153865, Hei 09-166875, 2001-324815, and Japanese Patent No. 2773981.

The relief printing plate obtained according to the manufacturing method of the present invention can be used for various uses such as, for example, plate materials for cardboard printing, flexible packaging printing, label seal printing, letter press, printing of displays, electronic materials, and the like.

EXAMPLES

Next, the present invention will be explained in more detail by way of Examples; however, the present invention is not limited thereto.

Example 1

A mixture of 40% by mass of an oxazoline group-containing polymer (trade name: WS500, manufactured by Nippon Shokubai Co., Ltd.) (oxazoline equivalent: 220 g-solid/eq., resin concentration: 40%), 20% by mass of a carboxyl group-containing photopolymerizable monomer (trade name: HOA-HH, manufactured by Shin-Nakamura Chemical Corporation) (acid value: 208), and 40% by mass of a carboxyl group-containing polymer (trade name: CBB3098, manufactured by Soken Chemical & Engineering Co., Ltd.) (acid value: 98) was dissolved in a methanol solution to give the solid content of 40% by mass. The solution was applied onto a PET film (thickness: 125 μm) using a bar coater to give a film thickness of 10 μm, and dried and allowed to react at 100° C. for 1 hour. Thereafter, a printing plate was manufactured by laminating on a photosensitive resin layer through crimping. Next, the printing plate was subjected to primary exposure at an exposure amount of 3000 mJ/cm$^2$, followed by development with a petroleum-based developer for 2 min. After drying at 50° C. for 50 min, post exposure was carried out.

Examples 2,3, Comparative Examples 1, 2

With respect to Examples 2, 3, and Comparative Examples 1, 2, a method similar to that in Example 1 was performed, except that the composition for forming the adhesive layer was produced with the constitution shown in Table 1.

Adhesion force was determined for Examples 1 to 3, and Comparative Examples 1, 2 after being manufactured. The results are shown in Table 1. The adhesion force in Table 1 is represented by the symbol as assigned below.

A: adhesion being rigid, and the strength after storage at 40° C for one month being also favorable;
B: aggregation disruption found; and
C: detachment found between layers each.

TABLE 1

| | Constitution ratio (% by mass) | | | Adhesion force | | |
|---|---|---|---|---|---|---|
| | Carboxyl group-containing polymer | Oxazoline group-containing polymer | Carboxyl group-containing photopolymerizable monomer | Substrate side | Photosensitive resin side | Film strength |
| Example 1 | 40 | 40 | 20 | A | A | A |
| Example 2 | 26 | 61 | 13 | A | A | A |
| Example 3 | 30 | 40 | 30 | A | A | A |
| Comparative Example 1 | 0 | 60 | 40 | A | A | B |
| Comparative Example 2 | 50 | 0 | 50 | C | A | A |

Examples 1 to 3 exhibited strong adhesiveness between the substrate and the photosensitive resin. Also, adhesion strength following storage at 40° C. for one month after the plate making was favorable.

Aggregation disruption of the adhesive layer occurred, and lowering of the adhesion force was found in Comparative Example 1 in which no carboxyl group-containing polymer was added. Also, in Comparative Example 2 in which the oxazoline group-containing polymer was not added, lowering of the adhesion force on the substrate side was found.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A composition for forming an adhesive layer comprising the following components in admixture:
    (a) a carboxyl group-containing acrylic polymer;
    (b) an oxazoline group-containing acrylic polymer; and
    (c) a photopolymerizable acrylic monomer containing a carboxyl group,
    wherein the adhesive layer is capable of adhering to a photosensitive resin layer and to a substrate in a relief printing plate.

2. The composition according to claim 1, wherein the number of oxazoline groups in the oxazoline group-containing acrylic polymer (b) is 1.1 to 10 times the total number of carboxyl groups in the carboxyl group-containing acrylic polymer (a) and in the photopolymerizable monomer (c).

3. A relief printing plate comprising a substrate and a photosensitive resin layer laminated via an adhesive layer, wherein the adhesive layer comprises the composition according to claim 1 or 2.

4. The plate according to claim 3, wherein the substrate comprises a carboxyl group-containing polymer.

5. The plate according to claim 4, wherein the substrate comprises polyethylene terephthalate.

6. A method for manufacturing a relief printing plate comprising:
    forming an adhesive layer on a substrate, said adhesive layer comprising the following components in admixture:
        (a) a carboxyl group-containing acrylic polymer;
        (b) an oxazoline group-containing acrylic polymer; and
        (c) photopolymerizable acrylic monomer containing a carboxyl group;
    curing the adhesive layer by heating the adhesive layer; and
    laminating a photosensitive resin layer on the adhesive layer to form the relief printing plate.

7. A relief printing plate comprising a substrate and a photosensitive resin layer laminated via an adhesive layer, wherein the adhesive layer comprises the composition according to claim 1.

8. A relief printing plate comprising a substrate and a photosensitive resin layer laminated via an adhesive layer, wherein the adhesive layer comprises the composition according to claim 2.

9. A method for manufacturing a relief printing plate according to claim 6, wherein the number of oxazoline groups in the oxazoline group-containing acrylic polymer (b) is 1.1 to 10 times the total number of carboxyl groups in the carboxyl group-containing acrylic polymer (a) and in the photopolymerizable monomer (c).

* * * * *